United States Patent [19]
Moon

[11] Patent Number: 5,768,362
[45] Date of Patent: Jun. 16, 1998

[54] MULTIPLE FIELD ENTRY TELEPHONE DIRECTORY FOR A CELLULAR TELEPHONE

[75] Inventor: Billy Gayle Moon, Apex, N.C.

[73] Assignee: Ericsson, Inc., Research Triangle, N.C.

[21] Appl. No.: 705,743

[22] Filed: Aug. 30, 1996

[51] Int. Cl.[6] ............................................. H04M 1/00
[52] U.S. Cl. .................. 379/356; 379/354; 379/93; 379/100.14; 379/93.23; 455/564; 455/556; 455/575
[58] Field of Search ........................ 379/356, 354, 379/93, 355, 359, 140, 216, 100.14, 93.23; 455/564, 556

[56] References Cited

U.S. PATENT DOCUMENTS

| | | | |
|---|---|---|---|
| 4,734,931 | 3/1988 | Bourg et al. | 379/93 |
| 4,811,111 | 3/1989 | Kurokawa | 379/100.14 |
| 4,885,580 | 12/1989 | Noto et al. | 379/354 |
| 5,243,643 | 9/1993 | Sattar, et al. | |
| 5,283,818 | 2/1994 | Klausner et al. | |
| 5,301,035 | 4/1994 | Hayafune | |
| 5,359,651 | 10/1994 | Draganoff | |
| 5,384,825 | 1/1995 | Dillard et al. | |
| 5,398,279 | 3/1995 | Frain | 379/140 |
| 5,465,401 | 11/1995 | Thompson | |
| 5,524,049 | 6/1996 | Akiyama | 379/354 |
| 5,553,125 | 9/1996 | Martensson | 379/140 |
| 5,561,705 | 10/1996 | Allard et al. | 455/564 |

Primary Examiner—Dwayne D. Bost
Assistant Examiner—Keith Ferguson
Attorney, Agent, or Firm—Jenkens & Gilchrist

[57] ABSTRACT

An internal telephone directory for storing telephone numbers and communication protocol parameters. The telephone directory includes a contact entry type and a data service entry type, with both entry types possessing an entry type flag to distinguish between them, and an alphanumeric tag for identification. The contact entry further includes a set of entry fields for storing telephone numbers associated with the alphanumeric tag. The data service entry further includes a set of entry fields for storing a data service telephone number and communication protocol parameters.

6 Claims, 4 Drawing Sheets

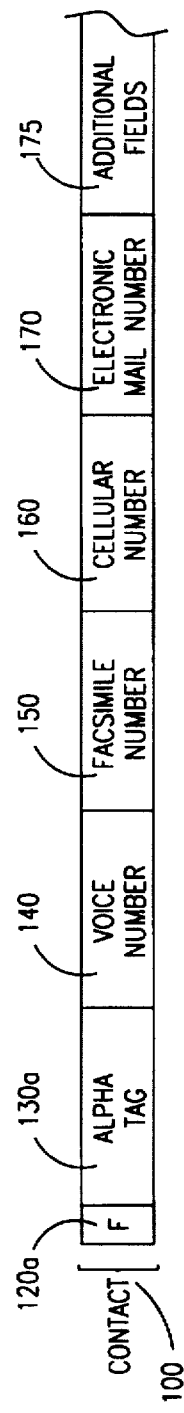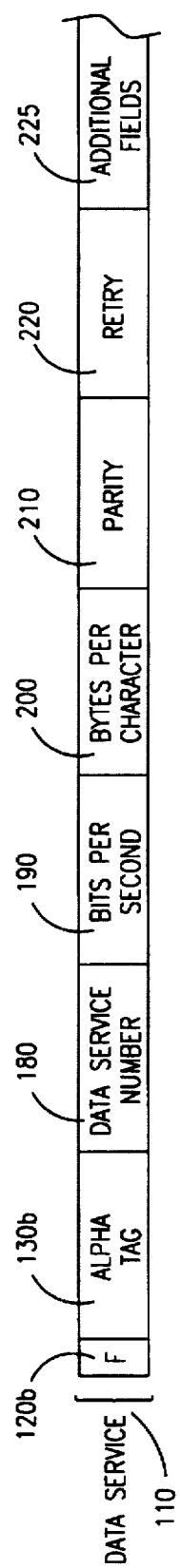

MULTIPLE FIELD ENTRY TELEPHONE DIRECTORY FOR A CELLULAR TELEPHONE

BACKGROUND OF THE INVENTION

1. Technical Field of the Invention

The present invention pertains in general to mobile communications devices possessing the capability to store and retrieve telephone numbers, and more particularly, to cellular telephones capable of storing and retrieving lists of telephone numbers associated with alphanumeric tags.

2. Description of Related Art

Most cellular telephones manufactured today include an internal telephone directory capable of storing and retrieving telephone numbers. The internal telephone directory on low-end models of cellular telephones has a set of memory locations where individual telephone numbers are stored. Each memory location is assigned an index number from 1 to n, with "n" equaling the number of memory locations available and thus, the number of telephone numbers capable of being stored. To enter a telephone number into the internal telephone directory of a low-end model, the user selects a memory location by its index number and enters the telephone number. To retrieve a telephone number for display, dialing, updating, or correcting on a low-end cellular telephone model, the user must make a selection using the index number representing the memory location where the particular telephone number is stored. The telephone number will be displayed and is available for modification or dialing. This process requires the user to remember the index number (memory location) for all telephone numbers placed in storage.

On more advanced cellular telephone models, the telephone directory includes an alphanumeric tag (alpha tag) which is associated with the stored telephone number. To enter a telephone number into the internal telephone directory, the user must select a memory location by specifying the index number associated with a particular memory location in a manner identical to the process of low-end models. However, the user is also given the option to input an alphanumeric tag which is associated with the particular memory location and telephone number. Alphanumeric tags are typically used to associate the name of a person whose telephone number is being stored (e.g., Billy, Billy's Office, and Billy's Car). The advantage to using alphanumeric tags is that it is easier for the user to remember the alphanumeric tag than the index number of the location where the desired telephone number is stored. When a user wishes to retrieve a telephone number, the user has the option of either entering the index number similar to low-end models or entering the alphanumeric tag.

Despite the advantages to using alphanumeric tags, there are also drawbacks Entering the alphanumeric tag on a cellular telephone using a standard cellular telephone keypad involves a tedious, confusing, and time consuming process. For example, many keys on the keypad represent up to three alphabetic letters and letters such as "q" and "z" require special procedures for entering. Many users find the process of entering the alphanumeric tags extremely frustrating and may simply decide not to use the internal telephone directory. Another drawback of using alphanumeric tags is the increased memory space required to store these tags. Each memory location requires the inclusion of additional memory space for storing the alphanumeric tag. Additional memory space requires additional hardware which, in turn, increases cost and hampers the trend toward miniaturization. In an effort to offset the disadvantage of increased memory requirements, manufacturers may simply choose to reduce the number of storage locations offered to users of the cellular telephones.

The need for alphanumeric tags, however, will only increase as more new services become available for cellular telephones. Such services include facsimile and data transmissions supported by IS-130 and IS-135 on the D-AMPS cellular system IS-136, as well as electronic mail and bulletin board services. Furthermore, many of these new services will require communication protocol parameters, such as data transmission rates, fax protocols, bits per second, bytes per character, among others. It would be convenient to store these parameters in the internal telephone directory and associate them with an alphanumeric tag. It is conceivable, therefore, that several pieces of information could be associated with the same alphanumeric tag. Under current storage techniques, however, this would require duplication of the alphanumeric tag for each entry. For example, the party a cellular telephone user wishes to call may have a voice telephone number, a fax telephone number, a cellular telephone number, and an electronic mail telephone number Using current techniques for storing this information requires the alphanumeric tag to be re-entered with each piece of information. Repeatedly entering these alphanumeric tags is time consuming for the user and is a redundant waste of memory storage.

The prior art teaches a number of methods having to do with the storage and automatic dialing of telephone numbers in an internal telephone directory of a telephone. These methods, however, primarily pertain to dialing of nonstandard telephone numbers or new features to be added to current memory dialing techniques. For example, in one method for memory dialing special telephone numbers having a variable length, the telephone automatically dials a portion and the user dials a portion. The method does not address the storage of multiple telephone numbers and communication protocols associated with an alphanumeric tag.

In another device, a sliding or rotary key is provided to allow the user to scan through the internal telephone directory. This provides an easier method for viewing and selecting telephone numbers from within the telephone directory, but does not provide for associating multiple telephone numbers and communication protocol information with a single alphanumeric tag.

There is a need then for a more efficient technique of storing telephone numbers, alphanumeric tags and associated communication protocol information. It would be advantageous to group the user information in some fashion to be associated with a single or reduced number of alphanumeric tags.

SUMMARY OF THE INVENTION

The present invention comprises an internal telephone directory for a telephone capable of storing telephone numbers and communication protocol parameters associated with an alphanumeric tag. The telephone directory is organized into two entry types, a contact entry type and a data service entry type. The contact entry also comprises several fields for storing telephone numbers associated with the alphanumeric tag. The data service entry includes one field for storing the telephone number of the data service associated with the alphanumeric tag and several fields for storing communication protocol parameters associated with the particular data service. Both entry types include an alphanumeric tag field for storing an alphanumeric tag to identify the particular entry.

BRIEF DESCRIPTION OF THE DRAWINGS

For a more complete understanding of the present invention, reference is made to the following detailed description taken in conjunction with the accompanying drawings wherein:

FIGS. 1A and 1B illustrate two internal telephone directory entry types of the present invention and the entry fields comprising them;

DETAILED DESCRIPTION OF THE INVENTION

Figure 2:
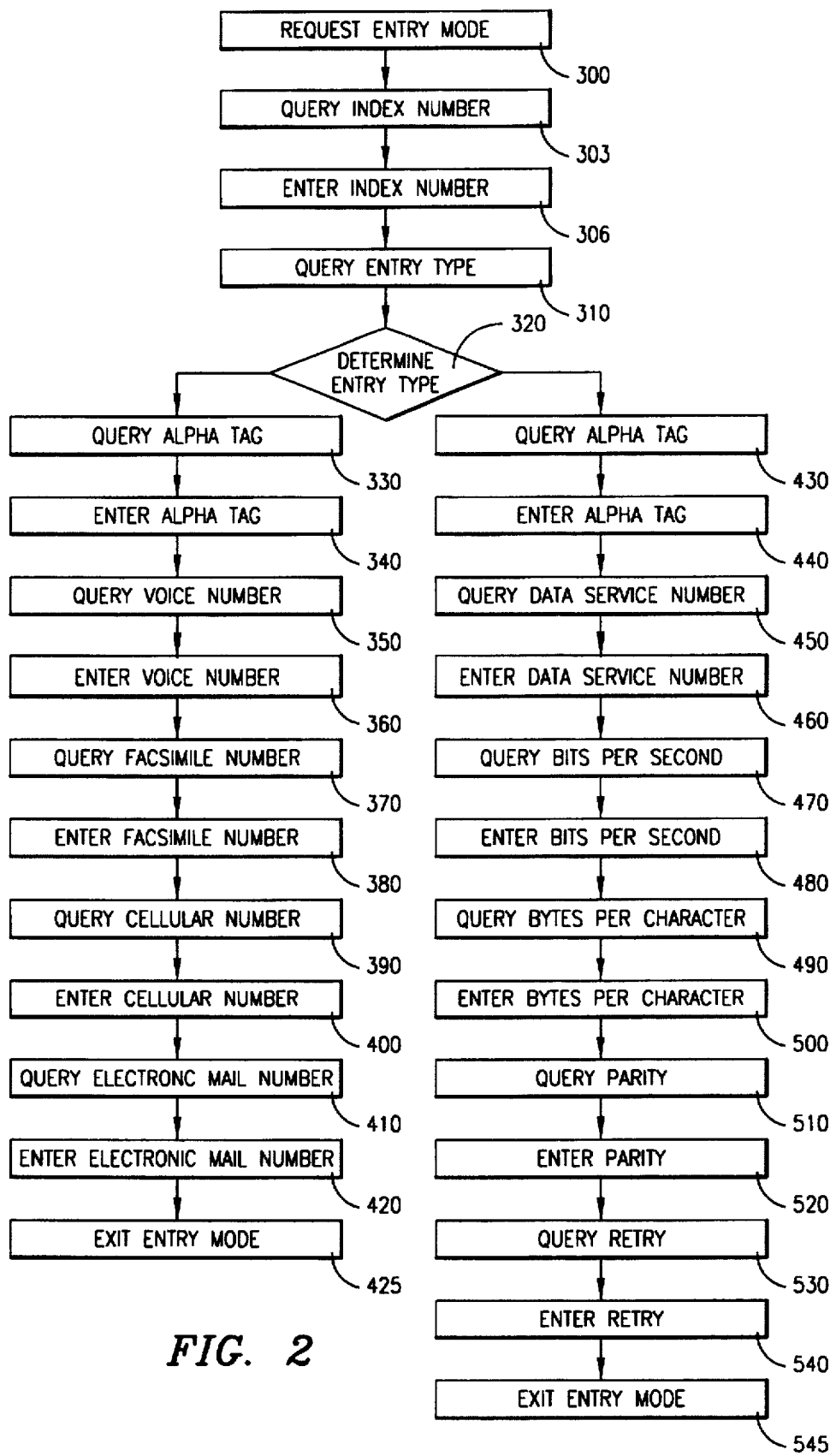
FIG. 2 is a flow diagram of an internal telephone directory data storage process of the present invention.

Referring now to FIGS. 1A and 1B, there are illustrated two internal telephone directory entry types of the present invention and the entry fields comprising them. Unlike current telephone directories, which possess a single entry type, the present invention comprises two types of entries, a contact entry 100 and a data service entry 110. The two entry types are distinguished from each other by the contents of an entry type flag field (F) 120a and 120b. This field contains a logical "1" or "0" depending on whether it constitutes a contact entry 100 or data service entry 110 respectively.

Both the contact entry 100 and the data service entry 110 possess an alphanumeric tag field 130a and 130b, respectively. The alphanumeric tags are used to associate a party, whose telephone number or other information is stored in the telephone directory, with a storage location in the telephone directory. Instead of remembering an index number of the storage location when retrieving stored telephone information the user simply needs to remember the alphanumeric tag associated with the storage location. The telephone directory user typically chooses the name of the party whose telephone information is stored in the telephone directory as the alphanumeric tag.

Turning now to the remaining fields comprising the contact entry 100, there is a field for a voice communication telephone number 140 for voice communication, a facsimile telephone number 150 for facsimile transmissions, a cellular number 160 for calls to a cellular telephone, and an electronic mail telephone number 170 for an electronic mail connection. These fields store telephone numbers for various communication devices connected to the Public Switched Telephone Network (PSTN) which are associated with the alphanumeric tag in some way. For example, if an alphanumeric tag 130a "Bob Smith" is entered for the name of the party having the entered voice communication telephone number 140, the facsimile number field 150 contains Bob Smith's facsimile telephone number, the cellular number field 160 contains Bob Smith's cellular telephone number, and the electronic mail field contains Bob Smith's electronic mail or computer telephone number. The present invention provides for associating all these telephone numbers with a single alphanumeric tag 130a rather than with three separate tags. While the embodiment of the present invention described in FIG. 1, depicts the contact entry 100 as storing only four telephone numbers, it is understood that the contact entry 100 could possess any number of additional telephone number fields 175 which would be associated with the alphanumeric tag 130a.

Like the contact entry type 100, the data service entry type 110 also comprises an entry type flag 120b and an alphanumeric tag 130b. Unlike the contact entry 100, however, the data service entry possess only one field containing a telephone number which is the data service number 180. Whereas a contact is likely to be a person or a business which has different telephone numbers for each of its communication devices, a data service such as a bulletin board service or an internet service typically has a single telephone number even though the service may have several telephone lines associated with a Local Access Group (LAG). A data service, however, requires several communication protocol parameters which must be specified at the initiation of the telephone connection. These parameters are stored in additional fields of the data service entry 110. There are fields for bits per second 190, bytes per character 200, parity 210, and retry 220. It is understood that while the data service entry 110 described in FIG. 1, depicts four communication protocol parameter fields, the data service entry 110 could possess any number of additional communication protocol parameter fields 225 to be associated with alphanumeric tag 130b.

Referring now to FIG. 2, there is illustrated a flow diagram of an internal telephone directory data storage process of the present invention. To enter telephone numbers, alphanumeric tags, and communication protocol information into the telephone directory the user must first make a request to enter the data entry mode (step 300). This is typically accomplished by pressing a single key or series of keys on the telephone keypad which have been designed to initiate the entry mode. The user is then requested to enter an index number (step 303) representing a storage location, whereupon the user enters an index number (step 306). The user is then requested to select between entering information relating to the contact entry or the data service entry (step 310). The query can be made on the alphanumeric display of the telephone by requesting the user to press the "0" or the "1" key representing the entry type flag 120a and 120b of FIGS. 1A and 1B.

If the telephone directory control logic determines that the user selected a contact entry (step 320), the user is asked to enter an alphanumeric tag (step 330) which becomes associated with the various contact telephone numbers to follow. The user enters the alphanumeric tag (step 340) and is asked to enter a voice telephone number (step 350), whereupon the user enters a voice telephone number (step 360). The user is next asked to enter a facsimile telephone number (step 370), whereupon the user enters a facsimile telephone number (step 380). The user is then asked to enter a cellular telephone number (step 390), whereupon the user enters a cellular telephone number (step 400). Finally, the user is asked to enter an electronic mail telephone number (step 410), whereupon the user enters an electronic mail telephone number (step 420) and the telephone exits the entry mode (step 425). The foregoing set of telephone number associated with the contact alphanumeric tag 130a of FIG. 1A, is not meant to be an exhaustive list. Further telephone numbers can be added for association with the alphanumeric tag. It will, of course, be understood that the user need not enter data in each field.

If, on the other hand, the telephone directory control logic determines that the user selected a data service entry type (step 320), then the user is asked to enter an alphanumeric tag (step 430) which becomes associated with a data service telephone number. The user enters the alphanumeric tag (step 440) and is asked to enter a data service telephone number (step 450), whereupon the user enters a data service telephone number (step 460). The user is next asked to enter the number of bits per second (step 470), whereupon the user enters the number of bits per second (step 480). The user is then asked to enter the number of bytes per character (step 490), whereupon the user enters the number of bytes per character (step 500). The user is next asked to enter the parity (step 510), whereupon the user enters the parity (step 520). Finally, the user is asked to enter the number of retries (step 530), whereupon the user enters the number of retries (step 540) and the telephone exits the entry mode (step 545). The foregoing set of communication protocol parameters associated with the data service alphanumeric tag, 130b of FIG. 1B, and the data service telephone number, 180 of FIG. 1B, is not meant to be an exhaustive list. Further communication protocol parameters can be added for association with the alphanumeric tag and telephone number. It is, of course, understood that the user need not enter data in each field.

Figure 3:
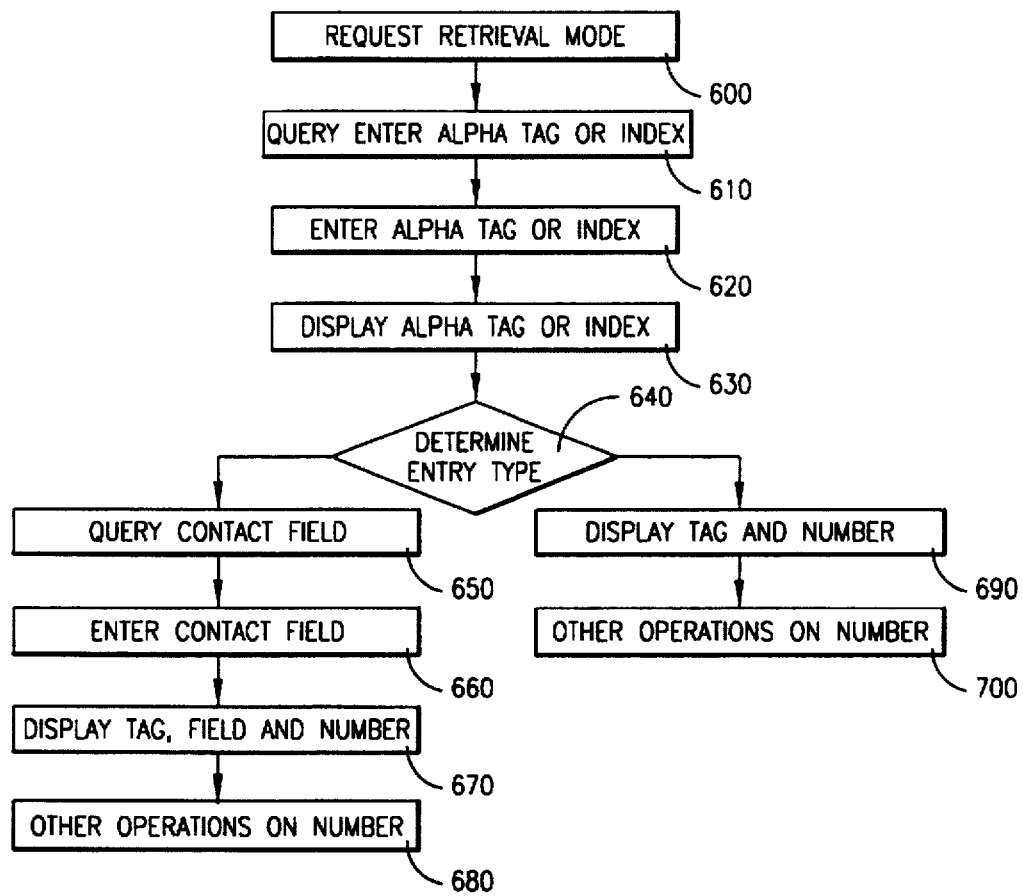
FIG. 3 is a flow diagram of an internal telephone directory data retrieval process of the present invention.

Referring now to FIG. 3, there is illustrated a flow diagram of an internal telephone directory data retrieval process of the present invention. To retrieve information stored within the internal telephone directory, the user must enter the retrieval mode (step 600). As with entering data, the process is typically accomplished by pressing a single key or a series of keys on the telephone keypad which have been designed to initiate the retrieval mode. The user is then asked to enter an alphanumeric tag or an index number representing the memory location (step 610), whereupon the user enters the alphanumeric tag or index number (step 620) and the alphanumeric tag and index number are displayed (step 630). The telephone directory control logic makes a determination as to what type of entry has been requested (step 640) by referring to the entry type flag field, 120a and 120b of FIG. 1, of the entry. If the user has requested a contact entry, the telephone will ask the user which of the various stored telephone numbers associated with the alphanumeric tag the user wishes to access (step 650). This can be effectuated in any of a number of ways. The telephone could request the user enter "V" or "1" for voice, "F" or "2" for facsimile; "C" or "3" for cellular, or "E" or "4" for electronic mail. The telephone could also ask the user to select a field as it scrolls through the various field names. Following the request for the contact field (step 650), the user will select a particular field (step 660) by one of the methods just described whereupon the telephone will display the alphanumeric tag 130a of FIG. 1A, the telephone number, and some indication as to which entry field has been selected (e.g., "V" for voice, "F" for facsimile, "C" for cellular, and "E" for electronic mail) (step 670). At this point, other operations can be performed on the selected telephone number (step 680). These operations are the same as are currently available on telephones and include dialing, updating/correcting, scrolling, and others.

If, on the other hand, the telephone directory control logic has determined that the user has requested a data service entry (step 640) the telephone will display the alphanumeric tag, 130b of FIG. 1B, and the telephone number. Since only one telephone number is associated with a data service entry, the user will not be requested to enter an entry field as with a contact entry. At this point, other operations can be performed on the selected telephone number (step 700). These operations are the same as are currently available on telephones and include dialing, updating/correcting the information, scrolling, and others.

Figure 4:
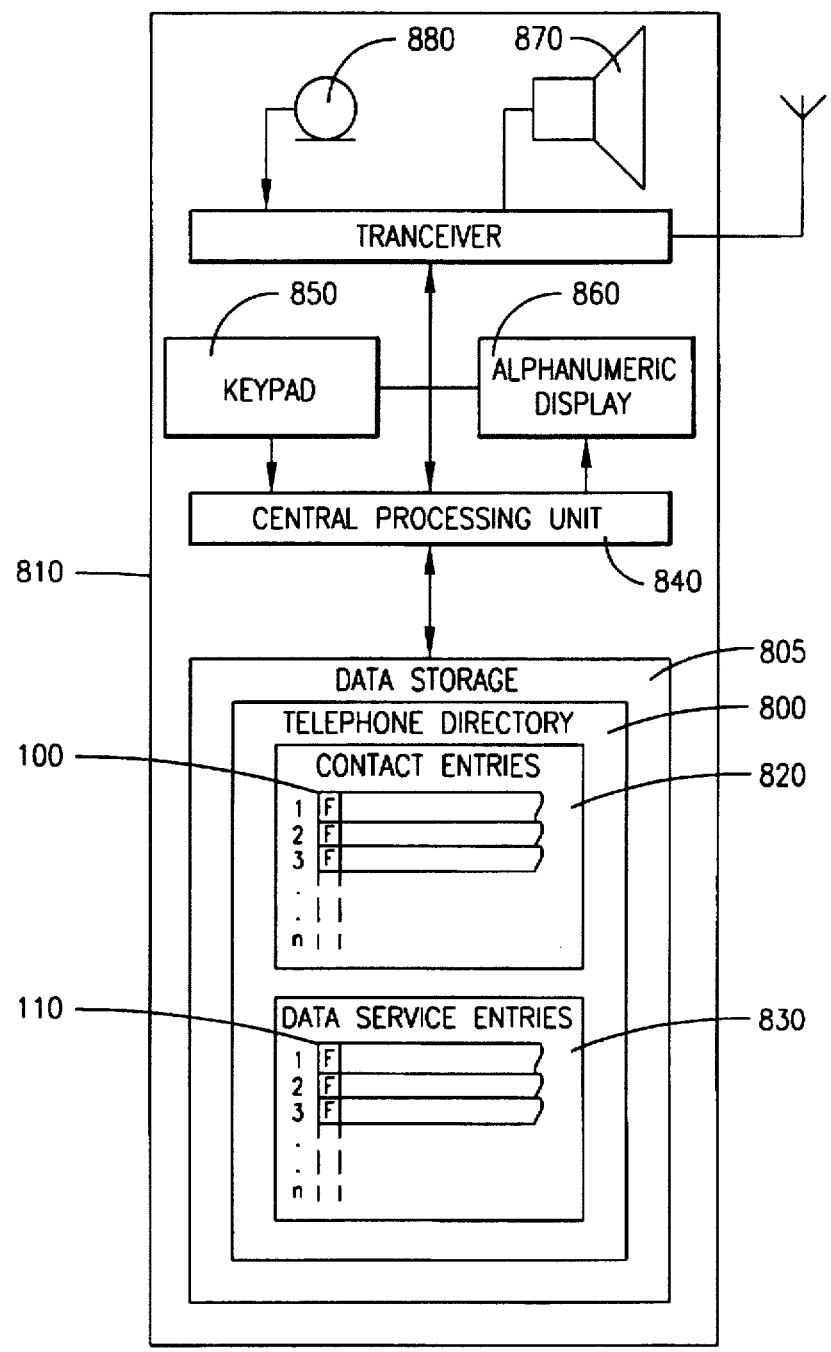
FIG. 4 illustrates a simplified block diagram of a cellular telephone for storing the two internal telephone directory types of FIGS. 1A and 1B.

Referring now to FIG. 4, there is an illustration of a simplified block diagram of a cellular telephone 810 for storing the two internal telephone directory types of FIGS. 1A and 1B. The telephone directory 800 of the present invention is located in a data storage 805 of the cellular telephone 810. In addition to non-telephone directory related storage requirements of the cellular telephone 810 known to those skilled in the art, the data storage 805 contains storage space 820 for contact entries 100 and storage space 830 for data service entries 110. The contact storage space 820 is capable of storing a plurality of contact entries 100 and the data service storage space 830 is capable of storing a plurality service entries 110.

Also located in the cellular telephone 810 is a central processing unit 840. The central processing unit 840 contains program software for implementing the data storage process of FIG. 2 and the data retrieval process of FIG. 3. Under the instruction of the program software, the central processing unit 840 directs the operation of a keypad 850, an alphanumeric display 860, a speaker 870, and a microphone 880 for interfacing to the telephone directory user when entering and retrieving information.

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications, and substitutions without departing from the spirit of the invention as set forth and defined by the following claims.

What is claimed is:

1. An electronic telephone directory for memory outdialing of telephone numbers comprising:

a first portion of memory for storing a plurality of contact entries, each of the contact entries including a plurality of contact entry fields for storing information associated with the contact entry and, further wherein, one of the contact entry fields for each of the contact entries stores a first flag for designating the entry as a contact entry;

a second portion of memory for storing a plurality of data service entries, each of the data service entries including a plurality of data service entry fields for storing information associated with the data service entry and, further wherein, one of the data service entry fields for each of the data service entries stores a second flag for designating the entry as a data service entry;

a data entry means for entering contact and data service information into the first portion and the second portion of memory; and a data retrieval means for retrieving contact and data service information from the first portion and the second portion of memory for memory outdialing.

2. The electronic telephone directory as in claim 1, wherein the contact entry fields further comprise at least two of the following fields:

an alphanumeric tag field for storing a name of a contact;

a voice number field for storing a telephone number for voice communication with the contact;

a facsimile number field for storing a telephone number for facsimile transmissions to the contact;

a cellular number field for storing a telephone number of a cellular telephone of the contact; and an electronic mail number field for storing a telephone number for sending and receiving electronic mail to the contact.

3. The electronic telephone directory as in claim 1, where the data service entry fields comprise at least two of the following fields:

an alphanumeric tag field for storing a telephone number of the data service;

a data service number field for storing a telephone number of the data service;

a bits per second field for storing a number of bits per second communications protocol parameter for communication with the data service;

a bytes per character field for storing a number of bytes per character communications protocol parameter for communications with the data service;

a parity field for storing a parity communications protocol parameter for communication with the data service; and a retry field for storing a retry communications protocol parameter for communication with the data service.

4. A method for organizing information in an electronic telephone directory for memory outdialing of telephone numbers comprising the steps of:

establishing a first portion of memory for storing a plurality of contact entries, each of the plurality of contact entries comprising a plurality of contact entry fields for storing information associated with the contact entry and, further wherein, one of the contact entry fields for each of the contact entries stores a first flag for designating the entry as a contact entry;

establishing a second portion of memory for storing a plurality of data service entries, each of the plurality of data service entries comprising a plurality of data service entry fields for storing information associated with the data service entry and, further wherein, one of the data service entry fields for each of the data service entries stores a second flag for designating the entry as a data service entry;

entering data into the contact entries;

entering data into the data service entries; and directing a data retrieval means for retrieving data from the contact entries and the data service entries for memory outdialing.

5. The method of claim 4, wherein the contact entry fields comprise at least two of the following fields:

an alphanumeric tag field for storing a name of a contact;

a voice number field for storing a telephone number for voice communication with the contact;

a facsimile number field for storing a telephone number for facsimile transmissions to the contact;

a cellular number field for storing a telephone number of a cellular telephone of the contact; and an electronic mail number field for storing a telephone number for sending and receiving electronic mail to the contact.

6. The method as of claim 4, wherein the data service entry fields comprise at least two of the following fields:

an alphanumeric tag field for storing a name of a data service;

a data service number field for storing a telephone number of the data service;

a bits per second field for storing a number of bits per second communications protocol parameter for use in communicating with the data service;

a bytes per character field for storing a number of bytes per character communications protocol parameter for use in communicating with the data service;

a parity field for storing a parity communications protocol parameter for use in communicating with the data service; and a retry field for storing a retry communications protocol parameter for use in communicating with the data service.

* * * * *

UNITED STATES PATENT AND TRADEMARK OFFICE
CERTIFICATE OF CORRECTION

PATENT NO. : 5,768,362
DATED : Jun. 16, 1998
INVENTOR(S) : Moon

It is certified that error appears in the above-identified patent and that said Letters Patent is hereby corrected as shown below:

| | |
|---|---|
| Column 5, line 40 | Replace "facsimile;"<br>With --facsimile,-- |
| Column 6, line 65 | Replace "where"<br>With --wherein-- |
| Column 7, lines 1-2 | Replace "telephone number of the"<br>With --name of a-- |
| Column 7, line 10 | Replace "communications"<br>With --communication-- |

Signed and Sealed this

Thirty-first Day of August, 1999

Attest:

Q. TODD DICKINSON

*Attesting Officer*     *Acting Commissioner of Patents and Trademarks*